Aug. 11, 1959   C. H. CLEMENT, JR   2,899,032
DRIVE AND CONTROL FOR ROTATABLE MEMBERS
Filed May 23, 1957   5 Sheets-Sheet 1
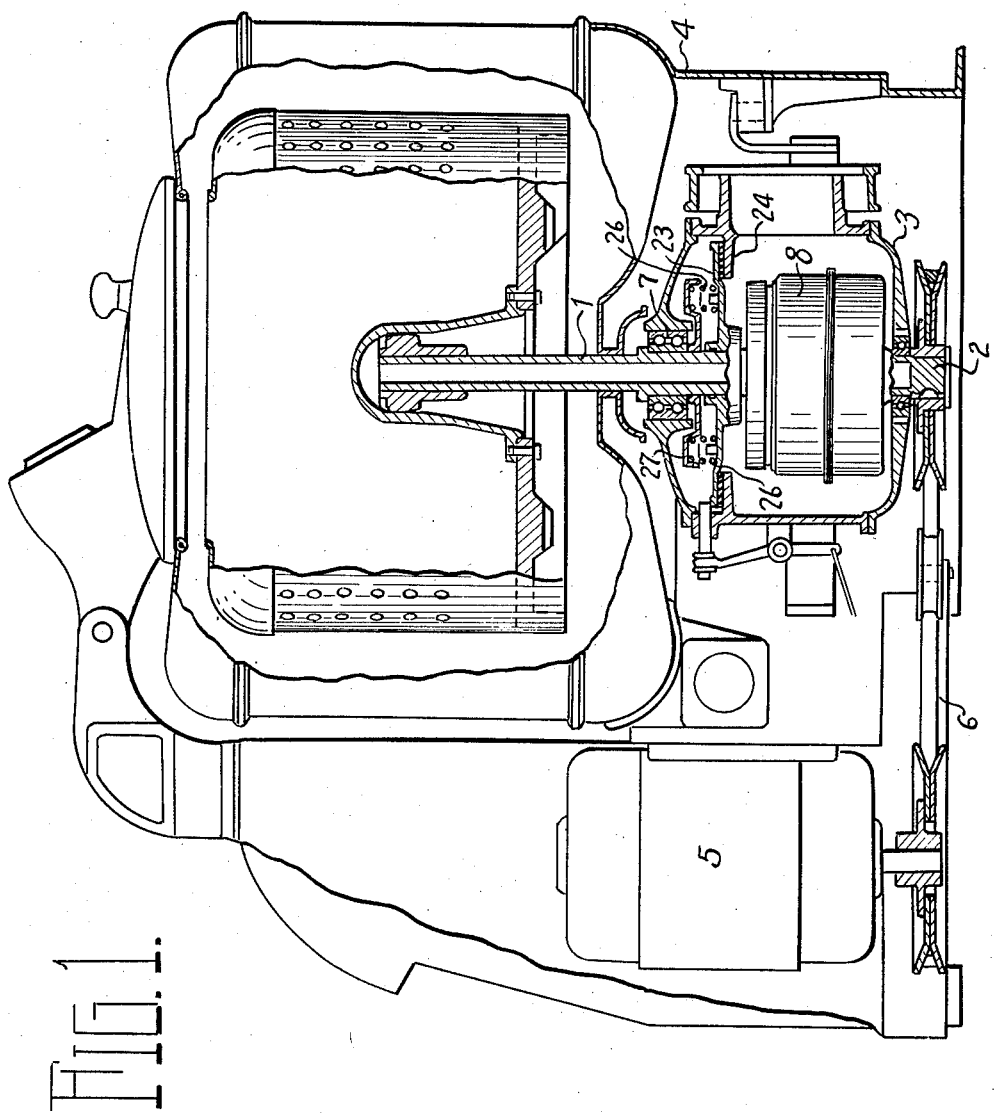
INVENTOR.
Carl H. Clement Jr.
BY Owen & Owen
ATTORNEYS

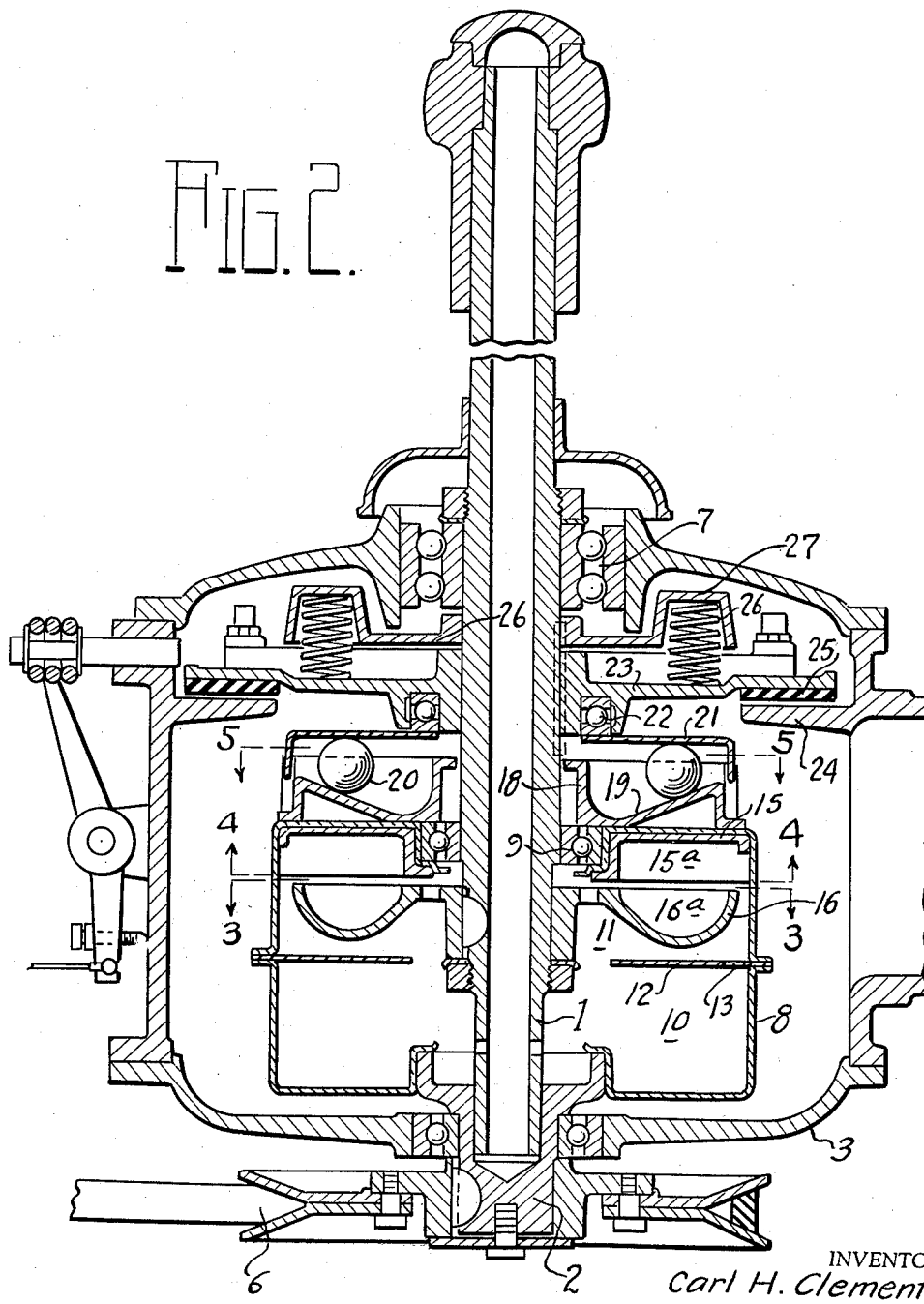

Aug. 11, 1959  C. H. CLEMENT, JR  2,899,032
DRIVE AND CONTROL FOR ROTATABLE MEMBERS
Filed May 23, 1957  5 Sheets-Sheet 3
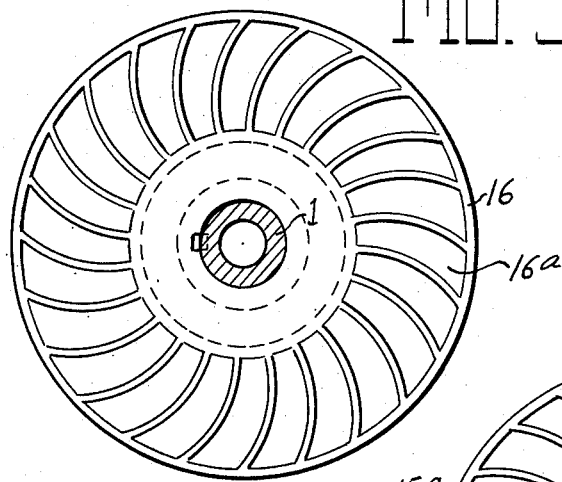
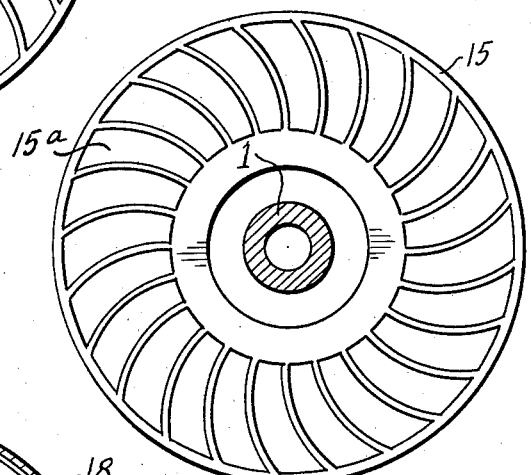
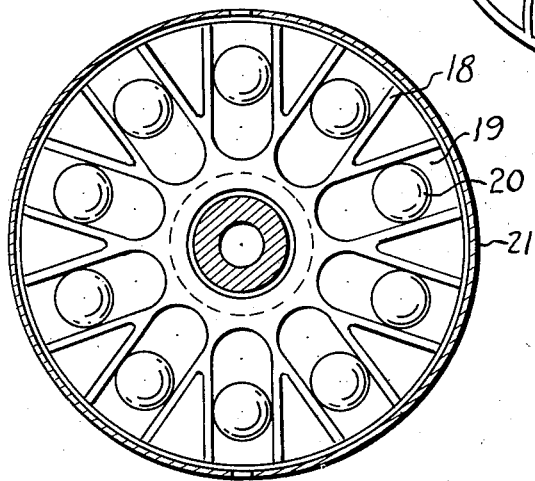
INVENTOR.
Carl H. Clement Jr.
BY Owen & Owen,
ATTORNEYS Aug. 11, 1959　　　C. H. CLEMENT, JR　　　2,899,032
DRIVE AND CONTROL FOR ROTATABLE MEMBERS
Filed May 23, 1957　　　　　　　　　　　　5 Sheets-Sheet 4
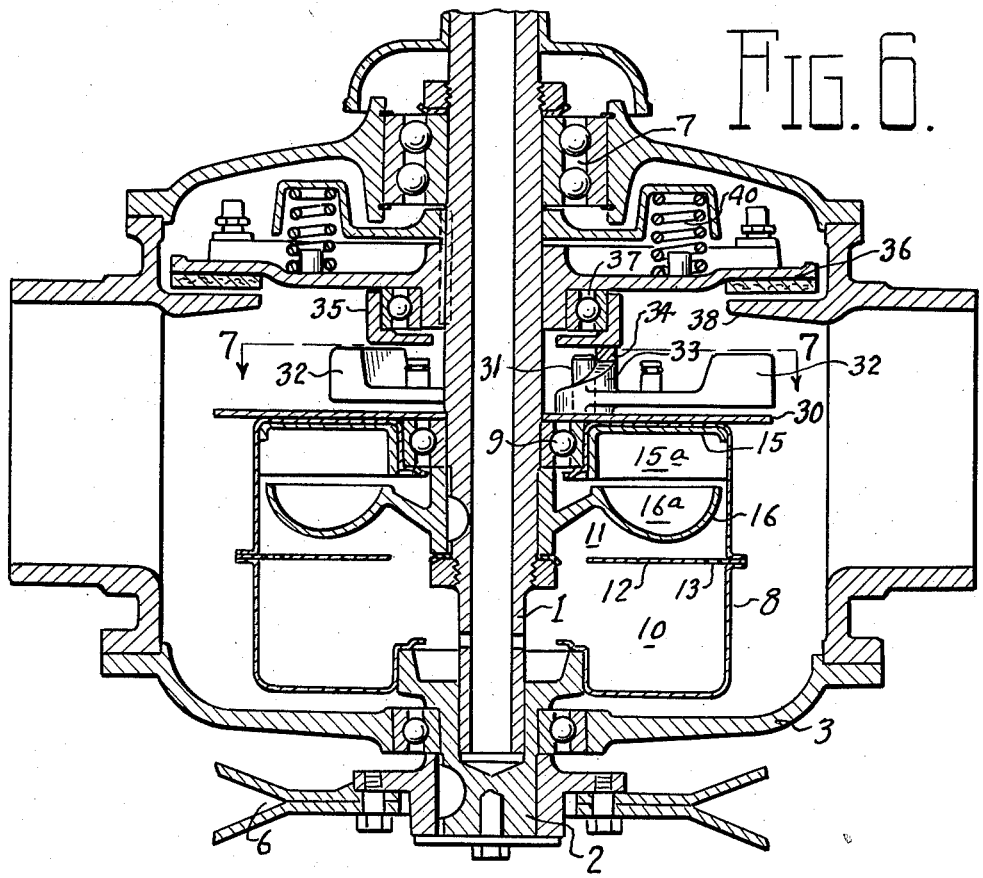
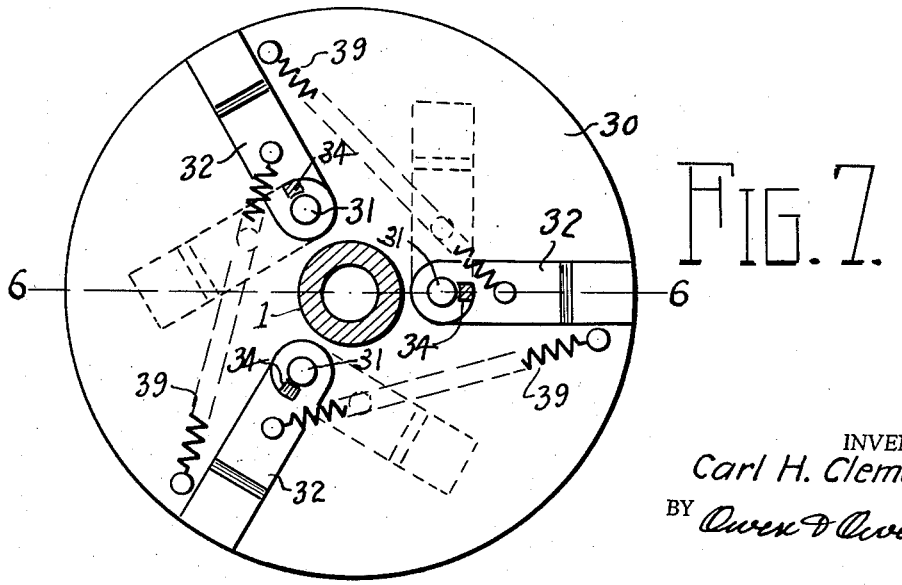
INVENTOR.
Carl H. Clement Jr.
BY Owen & Owen,
ATTORNEYS Aug. 11, 1959 C. H. CLEMENT, JR 2,899,032
DRIVE AND CONTROL FOR ROTATABLE MEMBERS
Filed May 23, 1957 5 Sheets-Sheet 5

INVENTOR.
Carl H. Clement Jr.
BY Owen & Owen,
ATTORNEYS

United States Patent Office 2,899,032
Patented Aug. 11, 1959

2,899,032

DRIVE AND CONTROL FOR ROTATABLE MEMBERS

Carl H. Clement, Jr., Perrysburg, Ohio, assignor to Bock Laundry Machine Company, Toledo, Ohio, a corporation of Ohio Application May 23, 1957, Serial No. 661,257

7 Claims. (Cl. 192—18)

This invention relates to power transmissions and particularly to means for applying rotation to shafts such, for instance, as the rotating basket-carrying shafts of centrifugal extractors, and automatically releasing or engaging a braking means therefor during a respective predetermined acceleration or deceleration of the driving mechanism, and the present application is a continuation-in-part of my application for patent Serial No. 639,921, filed February 13, 1957, which has been abandoned.

The primary object of the invention is the provision of simple, efficient and novel means for releasing by centrifugal action the normally applied brake of a rotating element and permitting application of the brake upon full deceleration of the speed of rotation of the element.

Another object of the invention is the provision of simple and novel means for releasing a brake by centrifugal action of rotating weight means whereby the centrifugal brake releasing force of the weight means is applied parallel to the axis of the shaft with which the brake cooperates.

A further object of the invention is the provision in combination with the driven rotatable element of a friction brake, of means for driving such element having an interposed fluid clutch embodying a simple metering device and causing a constant output of torque to be applied the driven element.

A further object of the invention is the provision of a simple and efficient drive and control means for a shaft including the novel combination of a shaft brake having a member rotatable with the shaft, a power source, a clutch between the source and shaft, and means centrifugally operated by rotation of the clutch members with the shaft to release the brake and permit free rotation of the shaft.

Further objects and advantages of the invention will be apparent from the following detailed description, and from the accompanying drawings illustrating one embodiment thereof, and in which—

Fig. 1 is a side elevation of a centrifugal extractor embodying the invention, with parts broken away and in section;

Fig. 2 is a central vertical section of a driven shaft and a drive and brake control means therefor embodying the present invention;

Fig. 3 is a top plan view of the driven member of the illustrated fluid clutch taken on the line 3—3 in Fig. 2;

Fig. 4 is a cross-section taken on the line 4—4 in Fig. 2, and showing a bottom plan view of the drive member of the fluid clutch;

Fig. 5 is a cross-section through the centrifugal brake releasing means taken on the line 5—5 in Fig. 2, with parts in full;

Fig. 6 is a view similar to Fig. 2, with a modified form of centrifugally operated brake release mechanism;

Fig. 7 is a section on substantially the line 7—7 in Fig. 6;

Figure 9:
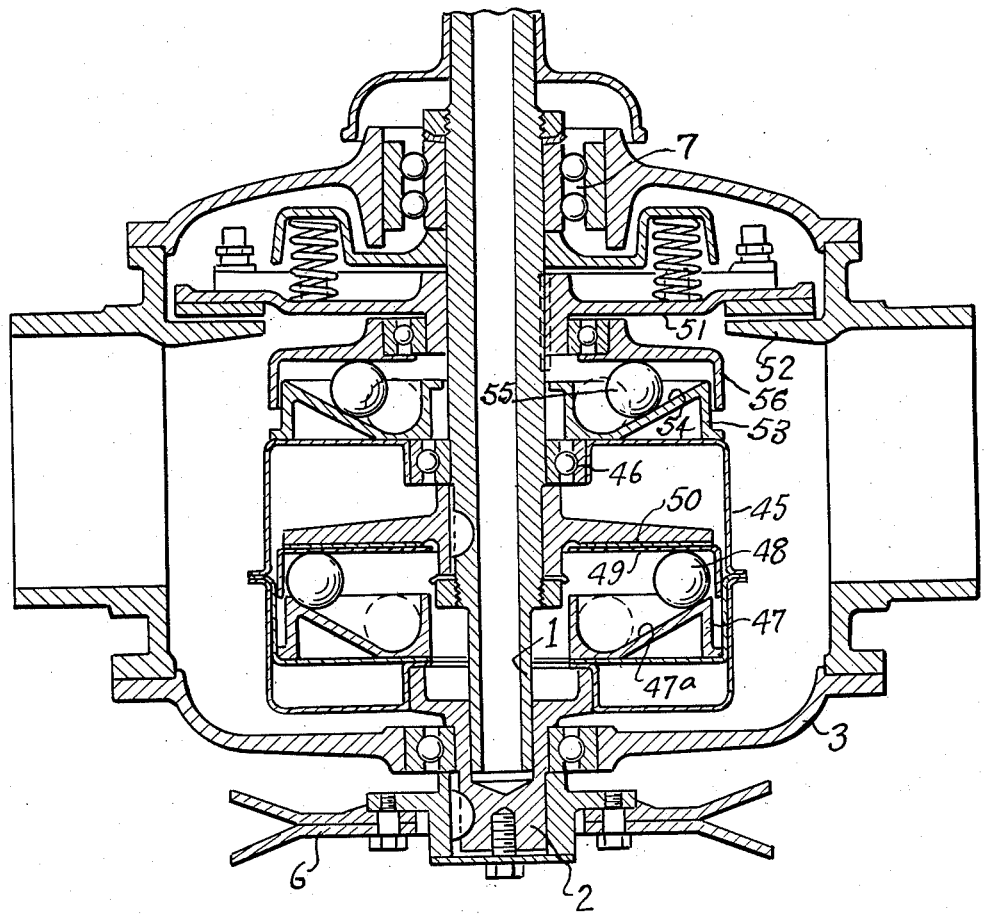
Fig. 9 is a view similar to Fig. 2, with another modified form of centrifugally operated brake release mechanism.
Figure 8:
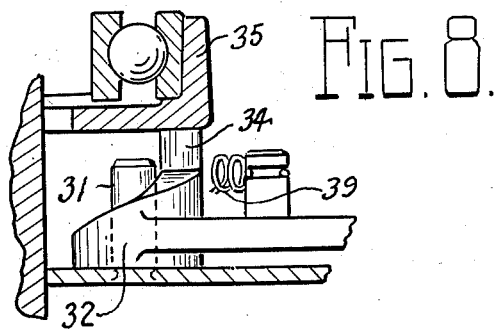
Fig. 8 is an enlarged fragmentary detail of the brake plate lifter means in Fig. 6.

The invention contemplates broadly the provision between a driven shaft and a drive means therefor of a normally engaged brake for the shaft, a clutch between the drive means and shaft automatically operable by speed of the drive means to drive the shaft, and means driven by the drive means and automatically operable by centrifugal action to release the brake and permit free rotation of the shaft.

The invention, three separate forms of which are shown, is illustrated, in the present instance, in association with the driven basket or container carrying shaft 1 of a centrifugal extractor but is not restricted to use in connection with such a shaft. This shaft is rotatably mounted at its lower end axially in a stub shaft or base bearing part 2 which in turn projects through and is rotatably mounted in the bottom of a housing 3 that is stationarily mounted in the lower portion of the machine casing 4. The stub shaft 2, which may receive its power from any suitable source, in the present instance, is driven by a motor 5 through a belt and pulley connection 6. The shaft 1 projects through a top opening in the housing 3 and has a bearing 7 therein.

Disposed within the housing 3, in the form shown in each of Figs. 2 and 6, is a drum or casing 8 concentric to the shaft 1 and fixedly attached at its lower end to the upper end of the stub shaft 2 to turn therewith. The upper end of the drum is rotatably mounted on the shaft 1 by a bearing 9. The casing 8 forms a chamber containing a liquid, preferably oil (not shown). This chamber is divided into lower and upper compartments 10 and 11, respectively, by a radially disposed baffle plate 12 extending inward a distance from the peripheral wall of the drum. The baffle plate 12 is provided adjacent to the drum wall with one or more small metering holes 13 through which oil that is thrown by centrifugal action against the outer wall of the lower or storage reservoir 10 may have a restricted flow into the upper compartment 11.

In the upper compartment 11, Figs. 2 and 6, is located a fluid clutch or coupling comprising, in the present instance, a drive member 15 fixed to the upper end of the drum 8 and a subjacent driven member 16 fixed to the shaft 1. The drive member 15 is provided on its bottom surface around its axis with a series of cups 15a and the driven member 16 is provided on its top surface or in facing relation to the cup 15a with a corresponding series of cups 16a. During rotation of the driven member 8, oil passes from the compartment 10 into the compartment 11 through the metering hole 13 in the baffle plate 12 and enters the cups 15a and 16a of the coupling members and the space between the members and causes a fluid driving of one member from the other and a consequent driving of the shaft 1.

Mounted on or over the upper end of the drum 8 (Fig. 2) to turn therewith and surrounding the shaft 1 is a ball race plate 18 having a circular series of radial raceways 19 in its top surface around the shaft. These raceways have their bottoms upwardly and outwardly inclined and each has a ball 20 therein of greater diameter than the depth of at least a considerable part of the inclined portion of its raceway so that upon an outward movement of the balls a lifter plate 21 resting thereon will be lifted parallel to the shaft axis. The lifter plate 21 turns with the drum 8 and in encircling relation to the shaft, and at its outer periphery has downturned stop flanges for limiting the outward radial movements of the balls.

Feathered to the shaft 1 for axial movements thereon and resting on the upper side of the lifter plate 21, through the medium of an antifriction bearing 22, is an annular brake plate 23 adapted when lowered to have friction brake coaction with an annular stationary flange 24 projecting inward from the housing 3 near its top. One of the coacting brake surfaces, preferably that of the plate, is faced with suitable brake lining material 25. The brake plate 23 is normally held seated on the flange 24 by the pressure of a set of coiled expansion springs 26 disposed between it and a superposed backing plate 27 that is keyed to the shaft 1 to turn therewith.

In the general functioning of the apparatus shown in Fig. 2, the stub shaft 2 and drum 8 are driven together by the power means, and when, upon starting, these parts approach full speed the lifting balls 20 rolling up the inclines 19 lift the plate 21 and brake plate 23 and release the brake 24, 25, permitting free rotation of the shaft 1. Acceleration of the shaft 1 will, of course, be governed by the load it drives. So long as the speed of driving of the drum 8 is maintained at sufficient level to hold the lifter balls 20 out and the brake plate raised, the drive will continue to turn the driven load. When the driving power is turned off or disconnected, the load is allowed to coast for a short time and as deceleration of speed occurs, the brake will be gradually applied due to recession of the balls assisted by pressure of the springs 26. This causes smooth and continued decelerating action of the driven load. At rest the brake remains applied and is, of course, released when a predetermined speed of the driven parts has been obtained. The time for obtaining such speed depends on the speed of flow of oil from one side to the other of the drum baffle plate 12.

In the form shown in Fig. 6, a plate 30 is mounted on the top of the drum 8 to turn therewith, and rising from this adjacent the shaft 1 is a circular series of equidistantly spaced pins 31, in the present instance three in number. On each of these pins is pivotally mounted a weight arm 32 which has at its inner end a cam portion 33 that coacts with a companion portion 34 on a ring member 35. This member supports the brake plate 36 through the interposed bearing 37 and raises it to disengage the stationary brake part 38 when the arms are thrown outwardly against the tension of the springs 39 which connect the arms to the plate 30, as shown in Fig. 7. The lifting of the brake plate 36 is resisted by springs 40 as described in connection with the form shown in Fig. 2.

In the form shown in Fig. 9, a centrifugally movable ball operated clutch is substituted for the fluid operated clutch of Fig. 2. In this form a drum 45 turns with the stub shaft 2 and has at its upper end a bearing 46 on the shaft 1. A ball race plate 47 is mounted in the lower part of the drum to turn therewith and this has outwardly and upwardly tapering raceways 47a in its top with radially movable balls 48 therein. These balls move by centrifugal action outwardly and upwardly in the races and lift a plate 49 resting thereon, thus causing the plate to frictionally engage and drive a plate 50 keyed to the shaft 1. A brake release means similar to that in Fig. 2 is disposed between the drum 45 and the brake plate for the shaft, which plate in this form is designated 51 and coacts with a stationary brake part 52. In this brake release means a ball race plate 53 turns with the drum 45 and shaft 1 and has tapered radial raceways 54 in its top surface for balls 55 so that when the balls move outwardly centrifugally they raise the lifter plate 56 and brake plate 57.

I wish it understood that my invention is not limited to any specific construction, arrangement or form of the parts, as it is capable of numerous modifications and changes without departing from the spirit of the claims.

I claim:

1. In a power transmission, a rotatable drive member, a driven shaft, a clutch connection between said drive member and driven shaft, a normally engaged brake for said driven shaft having a member movable parallel to the driven shaft axis to disengage the brake, and centrifugal acting weight means in the form of metal balls operable by rotation of the driving member of the clutch above a predetermined speed to impart disengaging movement to said movable brake member.

2. In a power transmission, a rotatable drive shaft, a rotatable driven shaft, a fluid clutch connection between said drive and driven shafts, said connection having drive and driven members operable at predetermined speed of the drive shaft to effect the driving of the driven shaft, a brake having a member movable parallel to the driven shaft axis to release and engage the brake, and weight means in the form of metal balls interposed between said clutch connection and brake operable by centrifugal action at predetermined speed of the clutch connection drive member to move said brake member to release the brake.

3. An arrangement as called for in claim 2 wherein said brake releasing means includes a member encircling the driven shaft and having a concentric series of radial upwardly and outwardly inclined raceways, and weight members in the form of balls are movable in said raceways and operable, when moved outwardly therein, to actuate said brake member to release the brake.

4. In a power transmission, a drive means, a driven shaft, a drive connection between said means and shaft, a brake for the shaft having a member movable lengthwise of the shaft to engage or release the braking action, and means rotatable with and surrounding the shaft and having radially movable round weights in connection with the movable brake member and centrifugally operable at predetermined driving speed of said connection to release said brake member and permit free rotation of the shaft.

5. In a power transmission, a drive means, a driven shaft, a driving connection between said means and shaft, a stationary brake member surrounding and radially spaced from the shaft, a movable brake member surrounding and rotatably movable by the shaft, one of said brake members being movable lengthwise of the shaft to engage and release the other, and means including centrifugally movable round weights actuated by said driving connection to lift the movable brake member and release the brake at predetermined speed of said connection.

6. In a power transmission, a drive means, a driven shaft, a fluid clutch connecting said means and shaft and having drive and driven members around the shaft, with the driven member connected to said shaft, a stationary brake member, a movable brake member keyed to the shaft to rotate therewith and have brake releasing and engaging movements lengthwise thereof, a disk-like part encircling the shaft and rotatable with the drive member of said clutch connection, and having a plurality of outwardly and upwardly inclined radial raceways on its top surface around its axis, round weights radially movable outward in said raceways when said part is rotated, and when so moved acting against said movable brake member to release it from braking engagement with the other brake member.

7. In a power transmission, a drive means, a driven shaft, a clutch connecting said drive means and shaft and having drive and driven members around the shaft, with the driven member connected to the shaft, said clutch being operable at predetermined speed of the shaft to drive one member from the other, a stationary brake member, a movable brake member keyed to the shaft to rotate therewith and for brake releasing and engaging movements lengthwise thereof, a disk-like part encircling the shaft and rotatable with the drive member of said clutch connection and having a plurality of outwardly and upwardly inclined radial raceways on its top surface around its axis, weights in the form of balls radially movable outward in said raceways when said part is rotated, and when so moved acting against said movable brake member to release it from braking engagement with the other brake member.

References Cited in the file of this patent

UNITED STATES PATENTS

| | | |
|---|---|---|
| 2,267,334 | Keller | Dec. 23, 1941 |
| 2,462,657 | McNairy | Feb. 22, 1949 |
| 2,596,927 | Hertrich | May 13, 1952 |
| 2,657,783 | Woodson | Nov. 3, 1953 |
| 2,720,955 | Young | Oct. 18, 1955 |

FOREIGN PATENTS

| | | |
|---|---|---|
| 436,016 | Great Britain | Oct. 3, 1935 |